Sept. 8, 1953  R. S. TOWER ET AL  2,651,219
SAW SHARPENER
Filed Aug. 8, 1950  2 Sheets-Sheet 1

Ralph S. Tower
Fred M. Burton
INVENTORS

BY *Clarence A. O'Brien*
*and Harvey B. Jacobson*
Attorneys

Sept. 8, 1953     R. S. TOWER ET AL     2,651,219
SAW SHARPENER
Filed Aug. 8, 1950     2 Sheets-Sheet 2
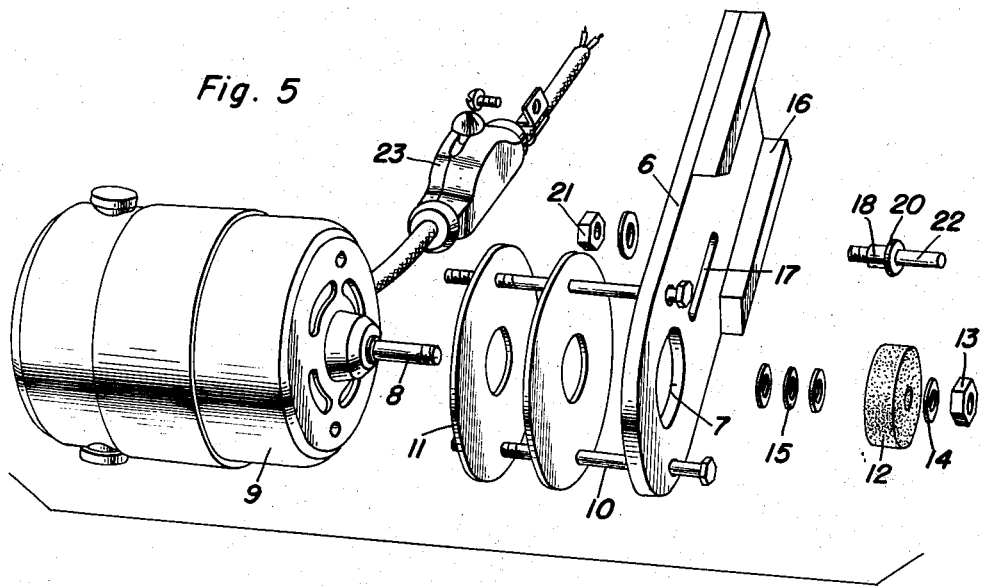
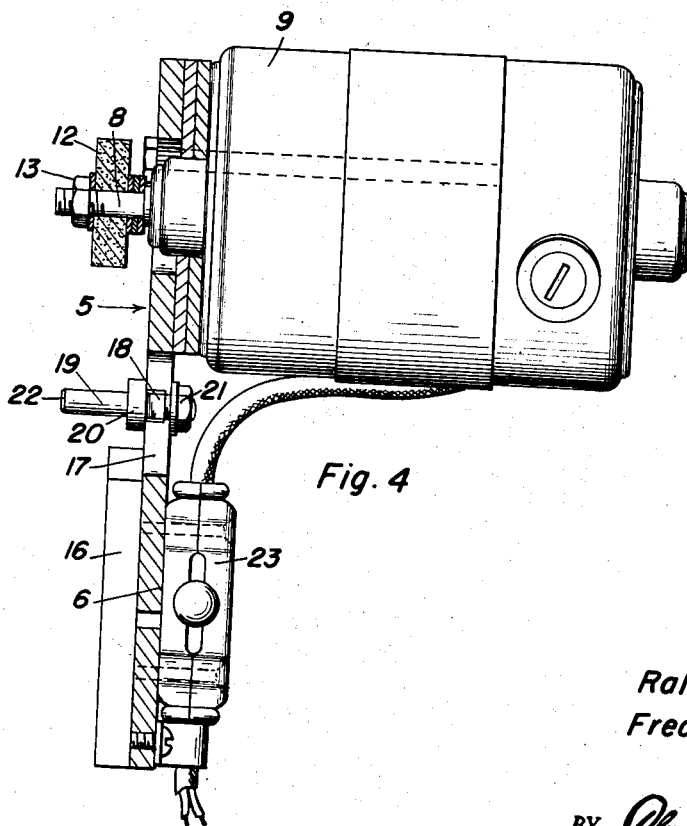
Ralph S. Tower
Fred M. Burton
INVENTORS Patented Sept. 8, 1953

2,651,219

UNITED STATES PATENT OFFICE 2,651,219

SAW SHARPENER

Ralph S. Tower, Cottage Grove, and Fred M. Burton, Eugene, Oreg.

Application August 8, 1950, Serial No. 178,292

2 Claims. (Cl. 76—37)

The present invention relates to new and useful improvements in saw sharpeners and more particularly to a motor operated sharpener for the teeth of circular saws.

An important object of the invention is to provide a mounting for a motor operated sharpening wheel with means for rockably supporting the mounting on the saw to hold the wheel in sharpening engagement with a saw tooth.

A further object of the invention is to provide means for easily and quickly changing the position of the motor mounting to advance the sharpener from tooth to tooth of the saw and when the saw is either in a horizontal or perpendicular position and without the necessity of removing the saw from its arbor.

Another object is to provide a supporting pin carried by the motor mounting for rockably supporting the sharpening wheel in sharpening position with respect to a saw tooth and with means for adjusting the supporting pin on the mounting in accordance with saw teeth of different sizes.

A still further object is to provide a sharpening device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 4 is an enlarged vertical sectional view of the motor supporting bracket and Figure 5 is a group perspective view of the several parts of the invention.

Figure 1:
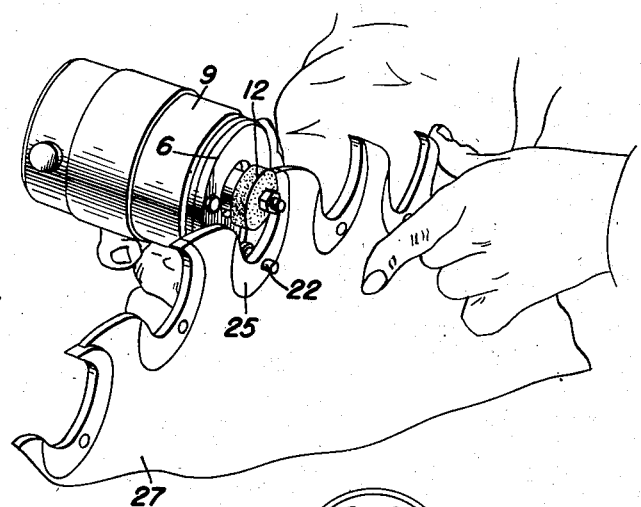
Figure 1 is a perspective view showing the sharpener supported in position on the saw.
Figure 2:
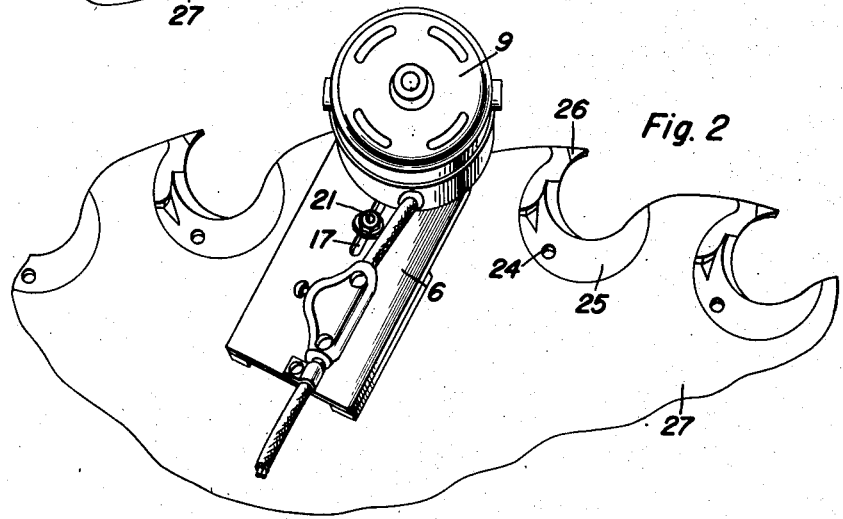
Figure 2 is a similar view showing the opposite side of the saw.
Figure 3:
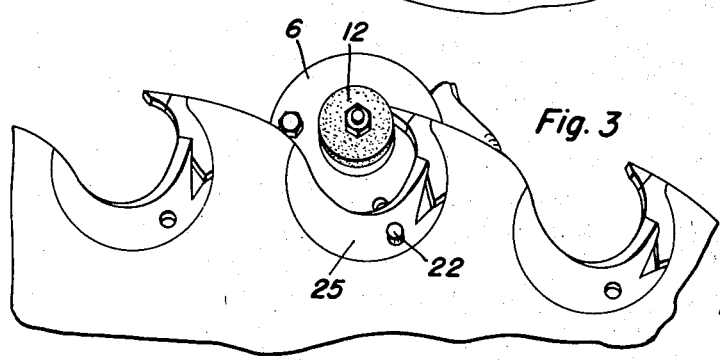
Figure 3 is a fragmentary side elevational view showing the sharpening wheel supported in sharpening position with one of the teeth of the saw.

Referring now to the drawings in detail wherein for the purpose of illustration we have disclosed a preferred embodiment of the invention, numeral 5 designates the motor mounting generally and which comprises an elongated plate 6 having an opening 7 adjacent one end through which the shaft 8 of an electric motor 9 projects and with the motor attached to one side of the mounting plate 6 by bolts 10 passing through the plate and threaded into one end of the motor. A suitable number of washers 11 are placed between the back of the plate 6 and the adjacent end of the motor.

An abrasive or sharpening wheel 12 is secured to the forwardly projecting end of the motor shaft 8 by a nut 13 threaded on the shaft and with washers 14 and 15 positioned at the opposite sides of the wheel.

A pair of rails or runners 16 are welded or otherwise suitably secured in spaced parallel relation with respect to each other and in a longitudinally extended position at the front side of the mounting plate 6 and at its end opposite from the opening 7.

The mounting plate 6 is also formed with a longitudinal slot 17 in which the flat sides 18 of a pin 19 is positioned to prevent rotation of the pin in the mounting plate, the pin being formed with a flange 20 positioned at the front side of the mounting plate and a nut 21 is threaded on the rear end of the pin at the opposite side of the mounting plate to hold the pin in longitudinally adjusted position in the slot 17. The rounded front end 22 of the pin projects forwardly beyond the plane of the rails or runners 16.

A switch 23 is secured to the rear side of mounting plate 6 for controlling the motor 9.

In the operation of the device, the rounded forwardly projecting end 22 of pin 19 is selectively placed in the opening 24 usually provided in the shank 25 of a saw tooth 26 for a circular saw 27 to rockably support the motor mounting 5 and sharpening wheel 12 in position for swinging the wheel into and out of sharpening position with the saw tooth by one end of a mechanic grasping the motor while the other hand holds the saw stationary. The saw tooth may thus be sharpened by the movement of the wheel 12 into engagement therewith.

The pin 19 is easily and quickly placed in position in the openings 24 of the respective teeth to advance the sharpener from tooth to tooth and the rails or runners 16 space the mounting plate 6 from the adjacent side of the saw 27 to hold the wheel 12 at the inside of the tooth of the saw and also reduces friction between the motor mounting and the side of the saw to facilitate the ease of swinging the motor mounting.

The pin 19 may be adjusted in the slot 17 of the motor mounting plate 6 in accordance with the size of the teeth of the saw.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. The combination of a circular saw having arcuate teeth recessed in the periphery of the saw and provided with an opening, and a saw sharpener comprising, a mounting plate, a plate supporting pin projecting laterally at one surface of the plate and adapted to enter the opening in one of the teeth to rockably support the plate in confronting relation against one side of the saw, said plate being manually rocked on the saw and said pin being manually held in said opening for quick interchangeable insertion in openings of successive teeth, said plate also having an opening adjacent one end, a motor supported on the outer surface of the plate and having a shaft rotatably positioned in said last named opening to project the shaft beyond the confronting surface of the plate, and a sharpening wheel secured to the shaft and supported by the pin within the arc of its engaged tooth for swinging movement into and out of sharpening engagement with the tooth upon a rocking movement of the plate.

2. The combination of a circular saw having arcuate teeth recessed in the periphery of the saw and provided with an opening, and a saw sharpener comprising, an elongated mounting plate having a slot therein extending longitudinally of the plate, a pin positioned in the slot and projecting laterally at one side of the plate and adapted to enter the opening in one of the teeth to rockably support the plate in confronting relation against one side of the saw, said plate being manually rocked on the saw and said pin being manually held in said opening for quick interchangeable insertion in openings of successive teeth, means securing the pin in longitudinally adjusted position in the slot to adjust the plate radially with respect to the saw, said plate having an opening adjacent its radially outwardly disposed end, a motor supported on the outer surface of the plate and having a shaft rotatably positioned in said last named opening to project the shaft beyond the confronting surface of the plate, and a sharpening wheel secured to the shaft and supported by the pin within the arc of the engaged tooth for swinging movement into and out of sharpening engagement with the tooth upon a rocking movement of the plate.

RALPH S. TOWER.
FRED M. BURTON.

References Cited in the file of this patent

UNITED STATES PATENTS

| Number | Name | Date |
| --- | --- | --- |
| 91,380 | Staffer | June 15, 1869 |
| 159,318 | Griswold | Feb. 2, 1875 |
| 204,749 | Mercer | June 11, 1878 |
| 693,985 | Moyes | Feb. 25, 1902 |
| 1,456,402 | Ramsey | May 22, 1923 |
| 1,620,165 | Orr | Mar. 8, 1927 |
| 1,771,602 | Armstrong et al. | July 29, 1930 |
| 1,803,934 | East | May 5, 1931 |
| 1,857,873 | Ross | May 10, 1932 |
| 1,999,322 | Enete | Apr. 30, 1935 |
| 2,249,743 | Bucknam | July 22, 1941 |
| 2,275,757 | Hanson, Jr. | Mar. 10, 1942 |
| 2,414,731 | Forbes, Jr. | Jan. 21, 1947 |
| 2,427,754 | Wahlstrom | Sept. 23, 1947 |
| 2,439,279 | Andrus | Apr. 6, 1948 |
| 2,490,244 | Wahlstrom | Dec. 6, 1949 |
| 2,568,062 | Fitch | Sept. 18, 1951 |